UNITED STATES PATENT OFFICE 2,161,654

PROTECTED VEGETABLE FIBROUS MATERIAL AND METHOD OF MAKING THE SAME

George H. Ellis, New Brighton, Minn., assignor to The Insulite Company, Minneapolis, Minn., a corporation of Minnesota No Drawing. Original application February 17, 1936, Serial No. 64,376. Divided and this application August 19, 1936, Serial No. 96,821

6 Claims. (Cl. 92—21)

This invention relates to a fungi and insect toxic fabricated vegetable fiber material and the method of making.

Fabricated vegetable material may be of any form or type and may be made of many different varieties of vegetable fibers. One of the most common forms of fabricated vegetable materials is the wall board.

In manufacturing fabricated vegetable fiber material, there is mixed therewith a group of substances which cooperate to protect it against both decay and insects, such as termites, and render it highly resistant to moisture.

An object of the invention is the manufacture of felted vegetable fiber products that have no objectionable odor and that can be made in a relatively inexpensive manner whereby the products will have a superior biological resistance.

A further object of the invention is the production of a rot-proof, insect-repellent and water-resisting product by a single treatment.

This invention comprehends the use of material or materials having toxic properties that are non-poisonous to human beings and that are devoid of objectionable odor and/or color.

It is preferred that tetrachloraphenate or a chlorinated phenol be used as the toxic agent but various other materials have been found to be satisfactory. Among the materials that have given satisfactory results are:

| Chemical | Inhibiting concentration, per cent |
|---|---|
| 2,4-dichlorophenol | 0.006. |
| Sodium 2,4-dichlorophenolate | 0.007. |
| 2,5-dichlorophenol | 0.004. |
| Sodium 2,5-dichlorophenolate | 0.007. |
| 2,4,5-trichlorophenol | 0.001. |
| Sodium 2,4,5-trichlorophenolate | 0.001. |
| 2,4,6-trichlorophenol | 0.002. |
| Sodium 2,4,6-trichlorophenolate | 0.004. |
| 2,3,4,6-tetrachlorophenol | 0.004 plus or minus. |
| Sodium 2,3,4,6-tetrachlorophenolate | 0.001. |
| Penthachlorophenol | 0.004 plus or minus. |

A toxic containing material having the properties of rendering vegetable fiber material insect and fungi toxic is incorporated in the product to be protected. For the purpose of this application it has been elected to set forth certain methods of applying the toxic material to wood or woody substance but it is to be understood that they are set forth for illustrative purposes only, and are not to be accorded any interpretation such as might have the effect of limiting what is claimed as the invention short of its true and comprehensive scope in the art.

In the general practice of manufacturing fibrous products, such as wall board, building board and insulating board, the fibers are suspended in water in the proportion of 1½ parts of fiber to 98½ parts of water. The percentages may be varied in the range of 4 parts of fiber to 96 parts of water. The toxic agent prepared as hereinafter described is well adapted to be used in fungi, insect and water-proofing manufactured fibrous products. It is contemplated to treat various products during or prior to formation into eventual production, whereby the treatment is equally effective throughout the entire body. It is also contemplated that the treatment may be applied to any product subject to attack by insects.

It has been found that zinc tetrachlorophenate when used in combination with a sizing material renders fiber composition insulating board and the like, rot and termite proof and greatly reduces the tendency of such material to absorb moisture.

It has been discovered that by adding zinc chloride to a solution of chlorinated phenol that the chlorinated phenol is rendered insoluble in water and produces a jelly-like mass which is very difficult to emulsify. Such emulsion is very difficult to spread over vegetable fibers during the manufacture of fibrous materials.

To overcome this difficulty and to reduce the quantity of toxic agent which has been found necessary to termite and rot proof vegetable fiber insulation boards and the like, it has been discovered that by dissolving a sizing material such as wood rosin soap in water to a concentration point of approximately 4% solids, and a tetrachlorophenate dissolved in water to approximate 4% of solids, and then mixing the sizing material with the solution of tetrachlorophenate. The proportions that have produced satisfactory results are 10 parts of sizing material and 4.9 parts of tetrachlorophenate. By adding the solution above referred to to vegetable fiber pulp so that the pulp will contain 1.48% of sizing material and .75% of tetrachlorophenate based on the dry weight of the vegetable fiber material and thereafter thoroughly mixing these materials with the fibrous material until the fibers are thoroughly coated. Zinc chloride is then dissolved in water to a suitable concentration, preferably about 2% solids, and added to the pulp in amount of about 0.25%, then thoroughly mixing the zinc chloride with the pulp or fibrous material and thereafter adding a precipitant to obtain a pH of approximately 5.4. The precipitant may be any that is desired, and alum or ferric chloride have been found to be the most economical to use.

The sizing material used and the toxic agent used are both alkaline and mix together readily, and they have the properties of spreading thinly over a large surface. This enables all the fibers to be readily coated with a solution of the toxic material. The zinc chloride is added to set the toxic agent on the fibers and renders the toxic material insoluble. The alum is then added to precipitate the sizing material. The result is that the fiber composition board or product is rendered resistant to water and extremely insect and rot resisting.

Specifically by way of example:
1. Dissolve 10# of wood rosin soap in water to a dilution of 4% solids.
2. Dissolve 4.9# of tetrachlorophenate in water to a dilution of 4% solids.
3. Dissolve 1.6# of zinc chloride in water to a dilution of approximately 2% solid.
4. Dissolve alum in water to a saturated solution.
5. Mix the solutions 1 and 2 and add to vegetable fiber material in a water bath so that a 1,000 square foot of ½ inch material will contain 10# of rosin size and 4.9# of tetrachlorophenate, or about 1.48% of rosin size and about ¾% of tetrachlorophenate, based upon the dry weight of the vegetable fibers.

Solution 5 is thoroughly mixed with the vegetable pulp and then solution 3 is added to obtain about 1.6# of zinc choride or about ¼% of zinc chloride, based on the dry weight of the fibers. After thoroughly mixing the fibers containing the solutions 3 and 5, there is added a sufficient amount of 4 or other precipitant to obtain a pH within the range of 4.8 to 5.8.

The best results are obtained by using 1 part of the toxic agent or its equivalent to .3 part of zinc chloride. To obtain the best results the zinc chloride may vary within the range of .2 part to .4 part to one part of the toxic material. The amount of zinc in other words, should be varied according to the alkalinity of the toxic material.

Broadly, the invention comprehends the production of vegetable fiber products that are rendered insect and fungi toxic and resistant to water in a rapid and economical manner. It is desired that the product so produced shall not have any objectionable odor and/or color. It will be obvious to those skilled in the art that many variations of steps and combinations of steps constituting the process and the product produced may be made which falls in the scope of the invention without departing from the spirit thereof.

The term precipitant as used herein is intended to cover any material which will precipitate the sizing material used in the process. The term toxic material as used herein, is intended to cover any toxic material having inhibiting concentration within the range of .001 to .007. Any suitable metal chloride may be used but the most economical results so far have been obtained by using zinc chloride.

This application is a division of my application, Serial No. 64,376, filed February 17, 1936.

What I claim is:

1. The method of producing water-resisting, insect and fungi toxic, felted, vegetable fiber products which includes the steps of mixing water soluble chlorinated phenol with rosin size, adding the mixture to vegetable fibers in a water bath, adding zinc chloride to insolubilize the phenol, and then adding alum.

2. The method of making felted, vegetable, fibrous material which comprises adding a solution of 4.9 parts of water soluble, chlorinated phenol and 10 parts of rosin to fibers in a water bath, adding 1.6 parts of zinc chloride, and then adding a saturated solution of alum, and felting the fibrous product.

3. A fabricated vegetable fiber product having distributed throughout the body thereof, an insect and fungi toxic substance comprising the reaction product of a water soluble, chlorinated phenol and zinc chloride and a rosin size precipitated by alum.

4. The method of producing water-resisting, insect and fungi-toxic, vegetable fiber products which includes mixing water soluble chloro-phenol with rosin sizing material, adding the mixture to fibers in a water bath, adding zinc chloride in an amount only to insolubilize the phenol, and thereafter adding alum to obtain a pH within the range of 4.8 to 5.8.

5. The method of producing water-resisting, insect and fungi toxic, vegetable fiber products, which includes mixing pentachlorophenol with a rosin size, adding the mixture to fibers in a water bath, adding zinc chloride in an amount only sufficient to insolubilize the pentachlorophenol adding alum to regulate the pH of the mixture, and forming the product.

6. The method of producing fungi and vermin resisting, vegetable fiber products which includes the steps of mixing pentachlorophenol with rosin size, adding the mixture to fibers in a water suspension, adding zinc chloride in an amount only sufficient to insolubilize the pentachlorophenol adding alum, and forming the product.

GEORGE H. ELLIS.